UNITED STATES PATENT OFFICE.

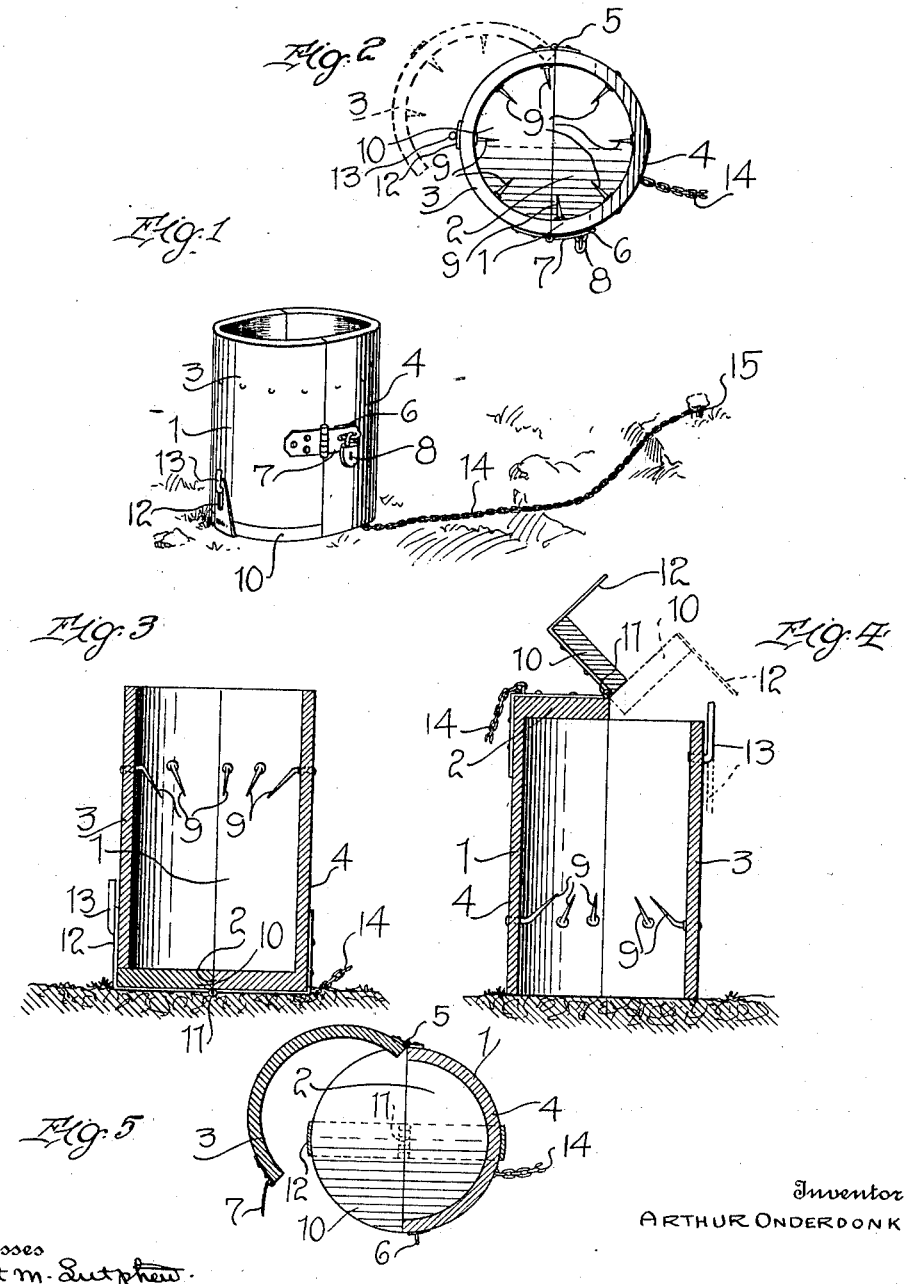

ARTHUR ONDERDONK, OF WASHINGTON, DISTRICT OF COLUMBIA.

TRAP.

1,113,043.  Specification of Letters Patent.  Patented Oct. 6, 1914.

Application filed April 2, 1914. Serial No. 829,121.

*To all whom it may concern:*

Be it known that I, ARTHUR ONDERDONK, a citizen of the United States, residing at Washington, in the District of Columbia, have invented certain new and useful Improvements in Traps, of which the following is a specification, reference being had to the accompanying drawings.

This invention comprehends certain new and useful improvements in animal traps and relates particularly to that type of trap composed of a hollow body portion with a number of spurs embedded therein and projecting inwardly from its inner wall, whereby the animal, when attracted by the bait and dropping into the barbed body portion will be impaled on the spurs and prongs and not be permitted to escape.

The invention has for its primary object an improved trap of this character which will be so constructed that it may be opened in such a manner as to admit of the release of the animal when it has been caught and killed, without injuring in any way the pelt or fur.

A further object of the invention is an improved trap embodying a movable section which may be opened after the animal has been caught in the trap to partially expose the head portion of the animal caught whereby it may be easily shot or otherwise killed if found alive, prior to its being removed from the trap. And the invention also aims to generally improve devices of this character so as to render them more useful and commercially desirable.

With these and other objects in view, as will more fully appear as the description proceeds, the invention consists in certain constructions, arrangements and proportions of the parts that I shall hereinafter fully describe and claim.

For a full understanding of the invention, reference is to be had to the following description and accompanying drawing, in which—

Figure 1 is a perspective view of my improved trap. Fig. 2 is a plan view thereof. Fig. 3 is a vertical sectional view of the device. Fig. 4 is a similar view with the device inverted, and the hinged bottom section open. Fig 5 is a horizontal section with one part of the trap body swung open.

Corresponding and like parts are referred to in the following description and designated in all of the views of the accompanying drawing by like reference characters.

Referring to the drawing, the numeral 1 designates the preferably cylindrical body portion of my improved trap, the same being formed with a bottom 2 and being composed either of wood, metal of any desired kind or character, or any other suitable substance or material, according to the particular requirements of the case, as for example, the size of the trap and the corresponding size or character of the animals for which it is designed.

The body portion 1 is formed in two substantially semi-cylindrical sections, designated 3 and 4, for the purposes of distinction. The section 3 is open from end to end, but the section 4 has the bottom 2 preferably integrally formed therewith. These two sections 3 and 4 are hingedly connected together at one side, as indicated at 5, and one of them is provided with some form of keeper, as at 6, and the other with some form of hasp or latch, as at 7, whereby the two sections may be securely held in closed position by a padlock 8 or the like. Both sections are provided with any desired number of inwardly or downwardly extending sharp prongs 9, projecting from their inner walls so as to impale upon them the animal who drops into the trap for the purposes of reaching the bait at the bottom thereof.

It is to be particularly noted that the bottom 2 is formed in two sections. One of these is the section integrally formed with the body section 4, as hereinbefore stated, and the other section designated 10, is hingedly connected to the first named section, as indicated at 11. The hinged section 11 of the bottom is provided with a slotted keeper 12, as shown, and the section 3 is provided on its outer wall with any desired construction of latch 13 designed for engagement with the keeper so as to hold the bottom section 11 in closed or operative position.

This trap is adapted to be placed upon the ground, resting upon its bottom, and to hold it in place and to prevent it from being dragged away, I secure it to a cable 14 which may be in the form of a chain, wire, or other rope. The chain is provided at one end with a loop 15 adapted to have a stake or the like run through it so as to effectually prevent the trap from being dragged away.

From the foregoing description in connection with the accompanying drawing, the operation of my improved trap will be apparent. In the practical use of the device, the trap in closed position is properly baited, the two body sections 3 and 4 being securely locked together and the hinged bottom section 11 being securely connected in closed relation to the body section, 3. When an animal is caught in the trap, it is only necessary to open the hinged bottom section 11 so as to expose the head portion of the animal without opening the bottom sufficient to allow the animal to escape and thus the animal can be promptly killed if not already dead when found. Then, after the animal has been killed the trap may be opened by unfastening the sections 3 and 4 and the animal easily removed without any danger of injuring its pelt or fur. Thus it will be seen that I have provided a very simple, durable and efficient construction of animal trap which may be used for catching not only small animals, but large ones also, according to the size and material out of which the trap is formed.

While the accompanying drawing illustrates the preferred embodiment of my invention, it is to be understood that various changes may be made in the construction, arrangement and proportions of the parts without departing from the scope of the invention as defined in the appended claims.

What I claim, is:

1. A trap of the character described including a longitudinally divided body portion provided with impaling prongs, the sections of said body portion being hingedly connected together along one longitudinal edge, means for fastening said sections in closed relation to each other, one of said sections being provided with a bottom and the bottom including a hinged section, the other body section and said hinged bottom section being provided with means whereby they may be connected together with the hinged bottom section in closed position.

2. A trap of the character described, including a longitudinally divided body portion provided with impaling prongs, the sections of said body portion being hingedly connected together along one longitudinal edge, means for fastening said sections in closed relation to each other, one of said sections being provided with a bottom and the bottom including a hinged section, the other body section and said hinged bottom section being provided with means whereby they may be connected together with the hinged bottom section in closed position, the hinged section of the bottom being movable in a plane at right angles to the plane of movement of the body sections.

In testimony whereof I hereunto affix my signature in the presence of two witnesses.

ARTHUR ONDERDONK.

Witnesses:
D. W. GALL,
FREDERICK S. STITT.

Copies of this patent may be obtained for five cents each, by addressing the "Commissioner of Patents, Washington, D. C."